(12) United States Patent
Petrina et al.

(10) Patent No.: US 12,122,211 B1
(45) Date of Patent: Oct. 22, 2024

(54) ADJUSTABLE CONTROL ARM AND BALL JOINT ASSEMBLY

(71) Applicant: RB Distribution, Inc., Colmar, PA (US)

(72) Inventors: Jonathan Petrina, Glenside, PA (US); Thomas Reiff, Portage, MI (US)

(73) Assignee: RB Distribution, Inc., Colmar, PA (US)

( * ) Notice: Subject to any disclaimer, the term of this patent is extended or adjusted under 35 U.S.C. 154(b) by 0 days.

(21) Appl. No.: 18/341,822

(22) Filed: Jun. 27, 2023

(51) Int. Cl.
*B60G 7/00* (2006.01)
*F16C 11/06* (2006.01)
*B62D 17/00* (2006.01)

(52) U.S. Cl.
CPC ............ *B60G 7/005* (2013.01); *B60G 7/001* (2013.01); *F16C 11/0619* (2013.01); *B60G 2200/156* (2013.01); *B60G 2204/416* (2013.01); *B60G 2204/61* (2013.01); *B60G 2206/16* (2013.01); *B62D 17/00* (2013.01)

(58) Field of Classification Search
CPC .................................................... B60G 7/005
See application file for complete search history.

(56) References Cited

U.S. PATENT DOCUMENTS

| | | | |
|---|---|---|---|
| 4,220,418 A * | 9/1980 | Kondo | F16C 11/0671 |
| | | | 277/391 |
| 6,293,724 B1 | 9/2001 | Spears et al. | |
| 6,343,889 B1 * | 2/2002 | Hendricks | F16C 11/0623 |
| | | | 403/135 |
| 6,478,318 B1 * | 11/2002 | Allman | B60G 7/008 |
| | | | 280/86.754 |
| 7,513,514 B1 * | 4/2009 | Schlosser | B62D 17/00 |
| | | | 280/86.756 |
| 8,544,861 B2 | 10/2013 | Frens | |
| 8,757,648 B1 * | 6/2014 | Winter | B60G 7/005 |
| | | | 403/77 |
| 8,925,944 B2 | 1/2015 | Byrnes | |
| 9,327,570 B2 | 5/2016 | Karpman et al. | |
| 9,409,598 B2 * | 8/2016 | Giorgi | F16C 7/00 |
| 9,751,370 B2 | 9/2017 | Weifenbach et al. | |
| 9,982,711 B1 * | 5/2018 | Henriksen | F16C 11/0642 |
| 10,155,424 B1 | 12/2018 | Elterman | |
| 10,450,005 B2 | 10/2019 | Weifenbach et al. | |
| 10,814,535 B2 | 10/2020 | Lee et al. | |
| 10,953,577 B2 | 3/2021 | Lee et al. | |
| 11,131,337 B1 * | 9/2021 | Miller | F16C 11/0604 |
| 11,241,928 B2 | 2/2022 | Kim et al. | |
| 11,491,837 B2 | 11/2022 | Kim et al. | |
| 11,499,589 B2 | 11/2022 | Miller et al. | |

(Continued)

FOREIGN PATENT DOCUMENTS

| | | | | |
|---|---|---|---|---|
| BR | PI0903326 A2 * | 5/2011 | | |
| KR | 100982526 B1 * | 9/2010 | | |
| WO | WO-2016015934 A1 * | 2/2016 | | B29C 37/0085 |

*Primary Examiner* — Nicole T Verley
(74) *Attorney, Agent, or Firm* — Volpe Koenig (57) ABSTRACT

The disclosure concerns a control arm and a ball joint assembly that are adjustable relative to each other via a fastener or threaded element passing through an over-dimensioned aperture in the arm body and connecting the ball joint assembly in a desired position on the arm body. The control arm mounts to a vehicle in the usual manner and the position of the ball joint assembly is then adjustable as needed in order to set a desired camber.

25 Claims, 10 Drawing Sheets

(56) References Cited

U.S. PATENT DOCUMENTS

| | | | | |
|---|---|---|---|---|
| 2004/0066015 A1* | 4/2004 | Kilburn | ............ | B60G 7/005 |
| | | | | 280/124.135 |
| 2005/0244214 A1* | 11/2005 | Kilburn | ............ | B60G 7/005 |
| | | | | 403/122 |
| 2008/0284165 A1* | 11/2008 | Chiang | ............ | F16L 21/002 |
| | | | | 285/261 |
| 2019/0071121 A1* | 3/2019 | Wilhelm | ............ | B62D 7/18 |
| 2021/0372463 A1* | 12/2021 | Miller | ............ | F16C 11/0604 |

\* cited by examiner

ADJUSTABLE CONTROL ARM AND BALL JOINT ASSEMBLY

BACKGROUND

Control arms are an important component of a vehicle's suspension that allow up and down movement of the suspension while securing the steering knuckles, spindles, and axles to the vehicle and in proper alignment. Control arms have undergone many changes as a result of automotive design and manufacturing technology.

Most modern control arms are adjustable control arms that permit a mechanic to adjust the vertical alignment or camber of the vehicle's wheels. Camber can be negative, the top of the wheel is tilted in, or positive, the top of the wheel is tilted out. Proper adjustment of camber can be major concern in damage repair, racing, and the lowering or lifting a vehicle from a stock position.

When one of these conditions arises with a car or truck that is beyond the adjustability provided in OEM parts, the issue is often addressed by installing adjustable control arms to correct the vehicle's camber. However, many of these solutions require the purchase of a particular control arm that addresses the specific, identified problem. This results in there being multiple replacement control arms, which can create supply and inventory problems.

SUMMARY

The disclosed control arm embodiments have an arm body and a ball joint assembly that are adjustable relative to each other to provide a greater range of adjustment and installation options. The control arm mounts to a vehicle and a ball joint assembly is adjustably mounted to the control arm body via a threaded element or fastener that extends through an over-dimensioned aperture (relative to the threaded element or fastener) in the control arm body connecting to an upper clamping plate. This allows the ball joint connected and/or fixed to the upper clamping plate to be arranged in a desired position with adjustability of the ball joint assembly in any direction within the limits of the over-dimensioned aperture.

DETAILED DESCRIPTION

Embodiments of the adjustable control arm and ball joint assembly will be described in detail with reference to the drawings where a same or similar element is identified with the same indicator throughout the description.

An adjustable vehicle suspension control arm 10 is shown in detail in FIGS. 1-16. The adjustable control arm 10 includes an arm body 20 to which a ball joint assembly 40 is adjustably attached. The arm body 20 has a first portion 22, shown with mounting ends 23, 24, that secure the adjustable control arm 10 to a vehicle. Each mounting end 23, 24 is illustrated with a respective bushing 25, 26 and an internal sleeve 27, 28 which may be made of steel or another suitable material. The configuration of the mounting ends 23, 24, the bushings 25, 26, and the sleeves 27, 28 may be varied according to the specific vehicle application. In the illustrated embodiment, the arm body is generally C-shaped with the mounting ends 23, 24 being located at the free ends of the C-shape. A second portion 29 of the arm body 20 is located opposite to the mounting ends 23, 24 and includes a through aperture 30 for adjustable mounting of the ball joint assembly 40.

As shown in detail in FIGS. 1-4, 11, and 12, the ball joint assembly 40 includes a top plate 50 that is positioned on a first side 29A of the arm body 20 at the second portion 29 and is configured to receive a fastener or threaded element 70 which extends through the through aperture 30. A ball mount 52 is located on and may be integrally formed with the top plate 50. In the illustrated embodiment, the ball joint assembly 40 includes a ball joint stud 42 that is pivotally connected to the top plate 50 via a ball 43 of the ball joint stud 42 being retained in the ball mount 52. As illustrated, the ball joint stud 42 may include a taper portion 44 as well as a threaded end 45 for connection to a wheel support assembly.

Figures 11, 12:
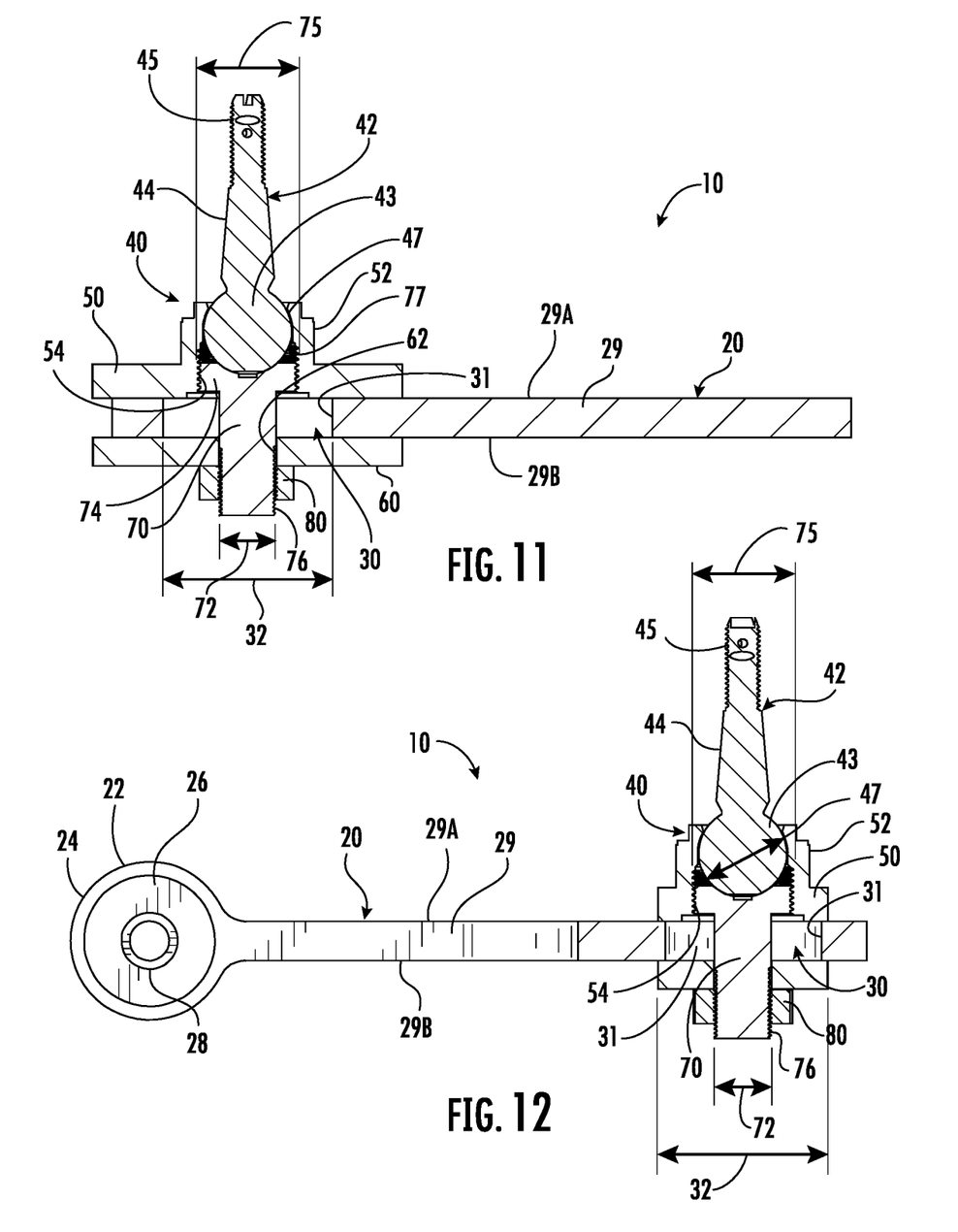
FIG. 11 is a cross-sectional view taken along line 11-11 in FIG. 5.
FIG. 12 is a cross-sectional view taken along line 12-12 in FIG. 5.
Figure 13:
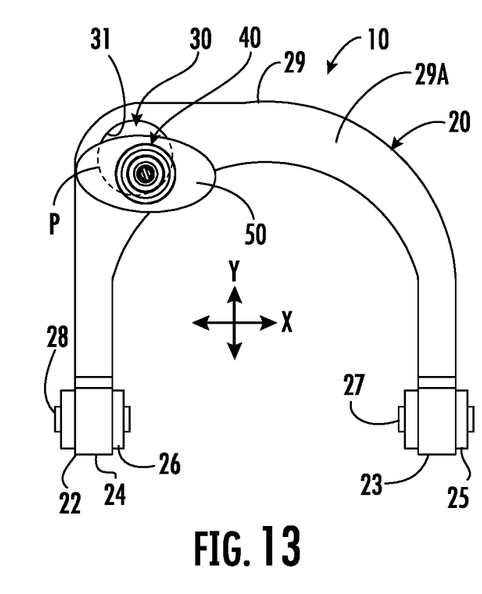
FIG. 13 is a top plan view similar to FIG. 5, showing an adjustable position of the ball joint assembly relative to the control arm body in a first location.
Figure 14:
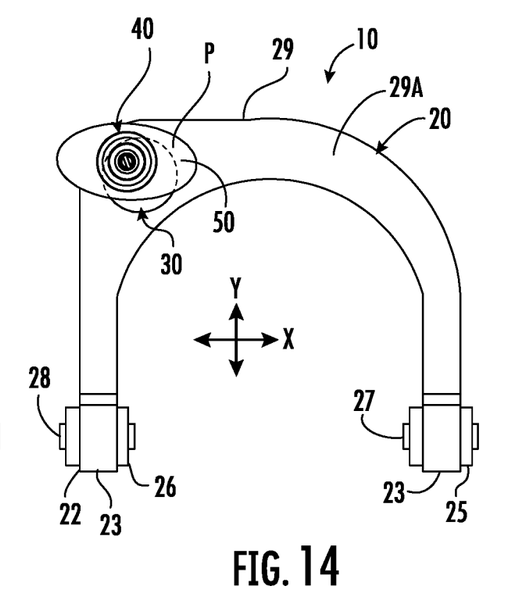
FIG. 14 is a top plan view similar to FIG. 13 showing an adjustable position of the ball joint assembly relative to the control arm body in a second location.
Figure 15:
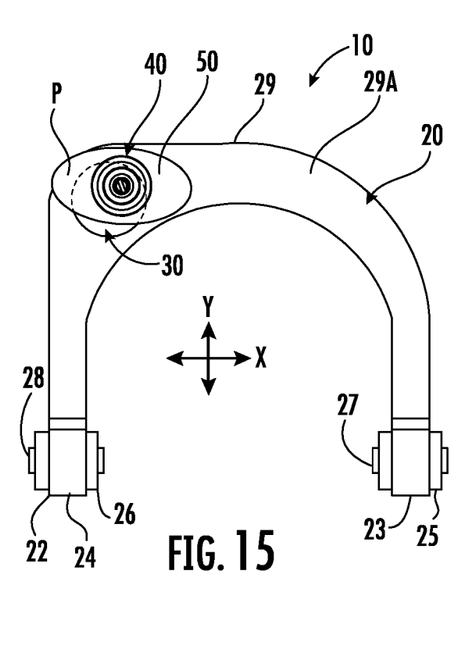
FIG. 15 is a top plan view similar to FIGS. 13 and 14 showing an adjustable position of the ball joint assembly relative to the control arm body in a third location.
Figure 16:
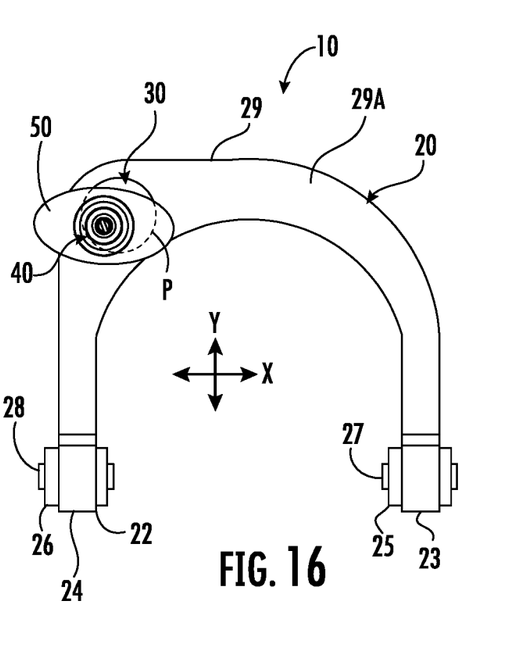
FIG. 16 is a top plan view similar to FIGS. 13-15, showing an adjustable position of the ball joint assembly relative to the control arm body in a fourth location.

The fastener or threaded element 70 extends through the aperture 30, which is larger than a largest cross-sectional dimension of the fastener or threaded element 70 that is located in the through aperture 30, i.e., the aperture 30 is over-dimensioned relative to the fastener or threaded element, as can be clearly seen for example in FIGS. 11 and 12. The fastener or threaded element 70 is tightened to secure the ball joint assembly 40 to the arm body 20 in a desired location. The fastener or threaded element 70 can be in the form of a bolt with an enlarged head that is larger than the through aperture 30 in the arm body 20. Alternatively, as shown in detail in FIGS. 3 and 4, the fastener or threaded element 70 can be threaded on both ends 74, 76, and a bottom plate 60 is located on a second side 29B of the second portion 29, opposite first side 29A, with the threaded element 70 extending through the aperture 30 and engaging with or acting on the top plate 50 and the bottom plate 60 in order to clamp on the top plate 50 and the bottom plate 60 against the second portion 29 of the arm body 20.

Referring to FIGS. 13-16, a position of the ball joint assembly 40 relative to the arm body 20 is adjustable in two dimensions X, Y by moveably positioning the ball joint assembly 20 at a desired location that is limited by a locus of contact points P between the fastener or threaded element 70 and an inner surface 31 of the through aperture 30. In a one embodiment, a diameter 32 of the through aperture 30 is at least about two times a diameter 72 of the fastener or threaded element 70 within the through aperture 30. More specifically, the diameter 32 of the through aperture can be three times a diameter 72 of the fastener or threaded element 70.

As shown in detail in FIGS. 3, 4, 11, and 12, in the illustrated embodiment, the threaded element 70 includes the first end 74 that is threadedly engaged in a complementarily threaded aperture 54 in the top plate 50. Here, the first end 74 has a diameter 75 that is provided as larger than a diameter 47 of the ball 43, and the ball 43 is insertable into the ball mount 52 through the aperture 54 in the top plate 50. The first end 74 of the threaded element 70 can also have a dome-shaped recess 77 that contacts the ball 43. This arrangement allows for more economic assembly of the ball joint assembly 40 and further allows for the pre-load on the ball joint stud 42 to be adjusted.

In the illustrated embodiment, the threaded element 70 includes the second end 76 that extends through a mounting aperture 62 in the bottom plate 60 and a nut 80 engages the second end 76 of the threaded element 70 and allows a proper fastening torque to be applied without affecting the preload on the ball 43 within the ball mount 52. However, those skilled in the art will recognize that the fastener or threaded element 70 could be in the form of a bolt having a head instead of the nut 80/threaded second end 76, and the bolt can be threaded into a portion of the top plate 50 in a manner that would not affect the pre-load of the ball 43 within the ball mount 52.

As shown in detail in FIGS. 11 and 12, in the illustrated embodiment, the first end 74 of the threaded element 70 has a diameter 75 that is larger than a diameter 72 at the second end 76 of the threaded element 70. By reducing the diameter of the threaded element 70 at the second end 76 which extends through the through aperture 30 in the arm body 20, a greater range of adjustability within the locus of contact points P, shown in FIGS. 13-16, is provided. It is noted that FIGS. 13-16 illustrate four potential locations for the ball joint 40 on the arm body 20; however, those skilled in the art will recognize that any position at or inside the locus of contact points P could be selected.

Figure 1:
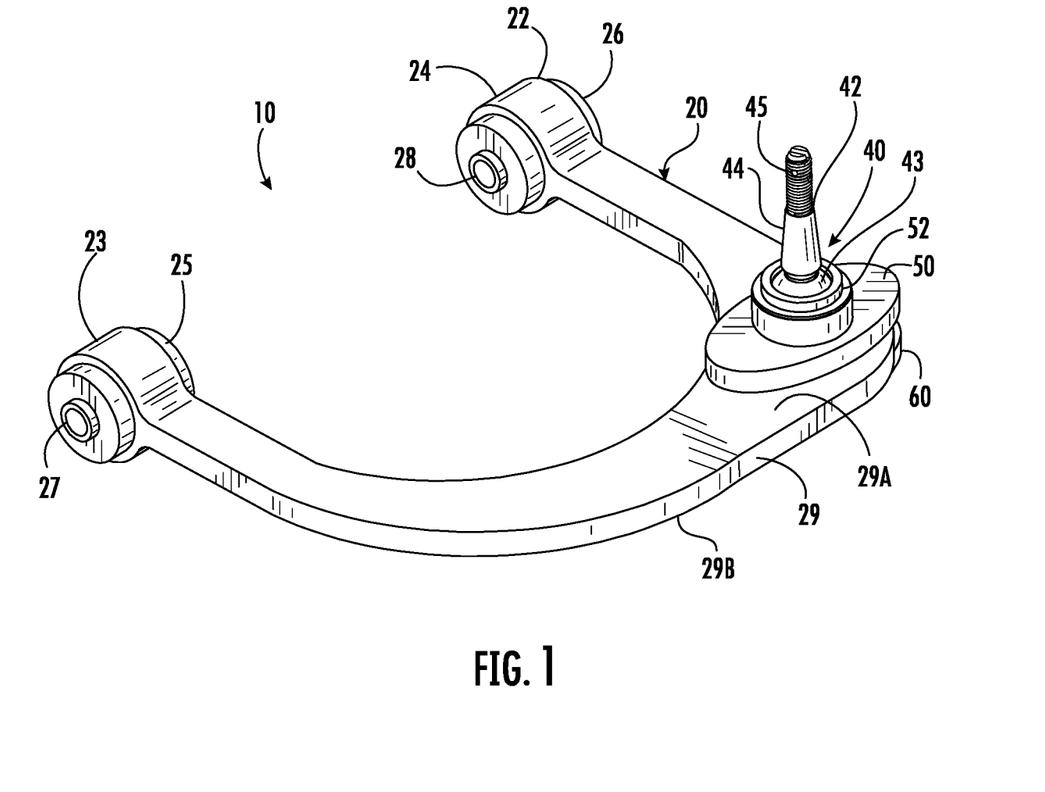
FIG. 1 is a top, front, left perspective view of a suspension control arm, and specifically an adjustable control arm having an arm body and a ball joint assembly, in accordance with the disclosure.
Figure 2:
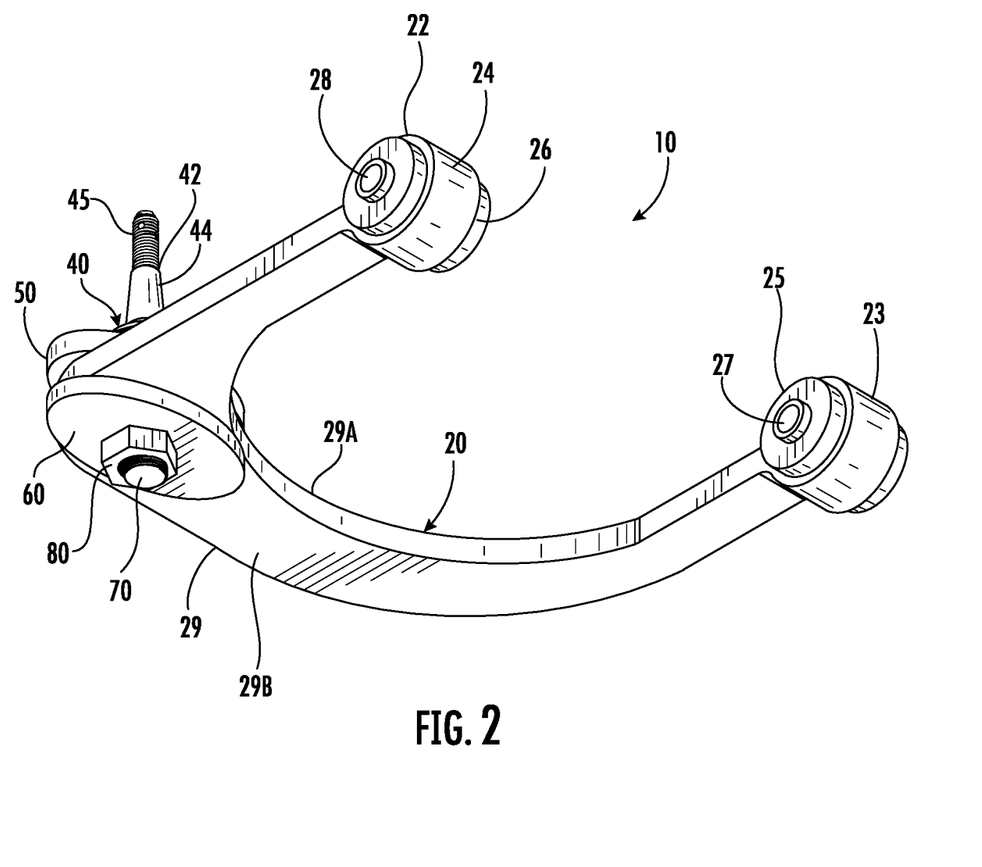
FIG. 2 is a bottom, rear, right perspective view of the adjustable control arm shown in FIG. 1.
Figure 3:
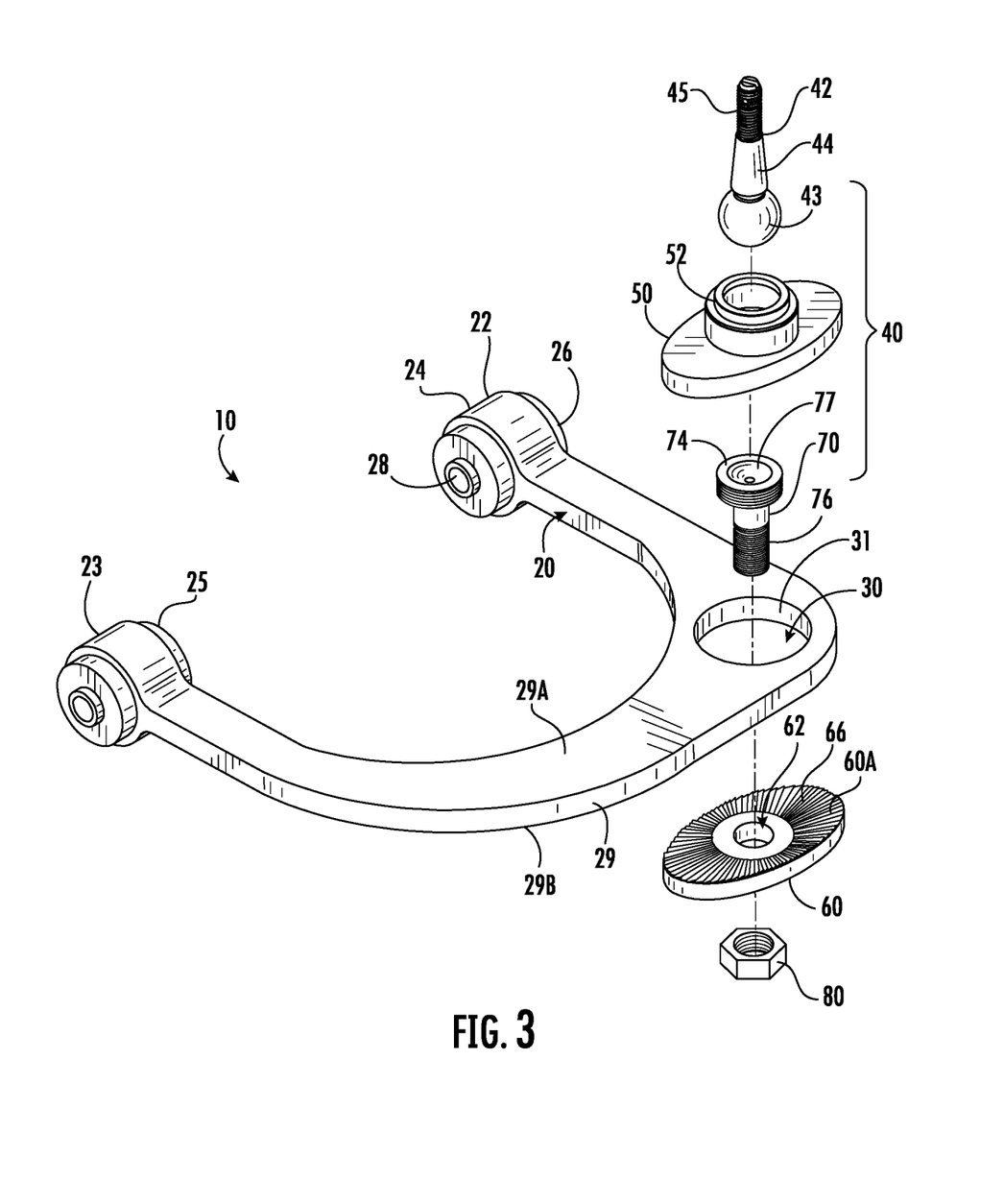
FIG. 3 is an exploded perspective view of the adjustable control arm shown in FIG. 1.
Figure 4:
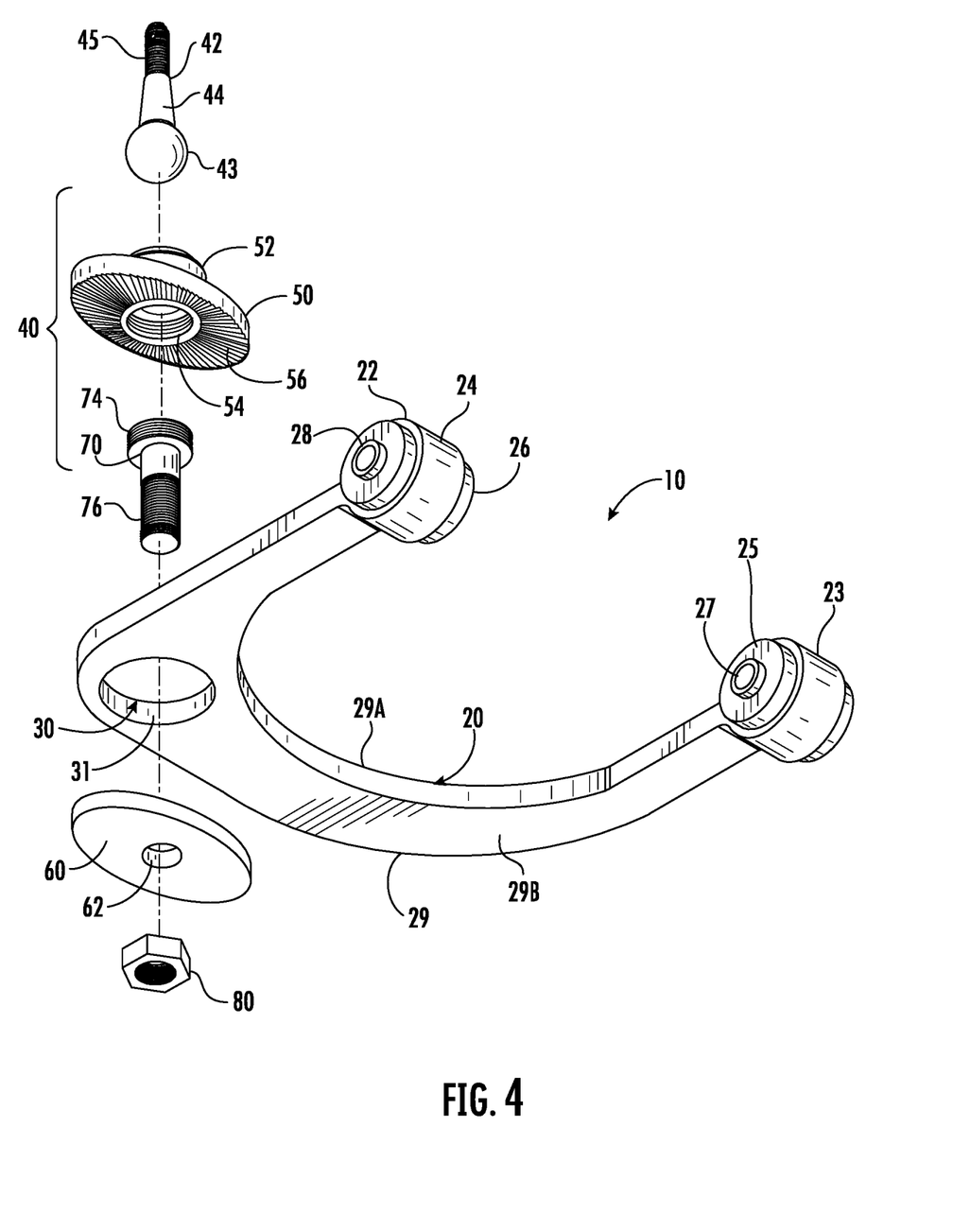
FIG. 4 is an exploded perspective view of the adjustable control arm taken from the same viewpoint shown in FIG. 2.
Figure 5:
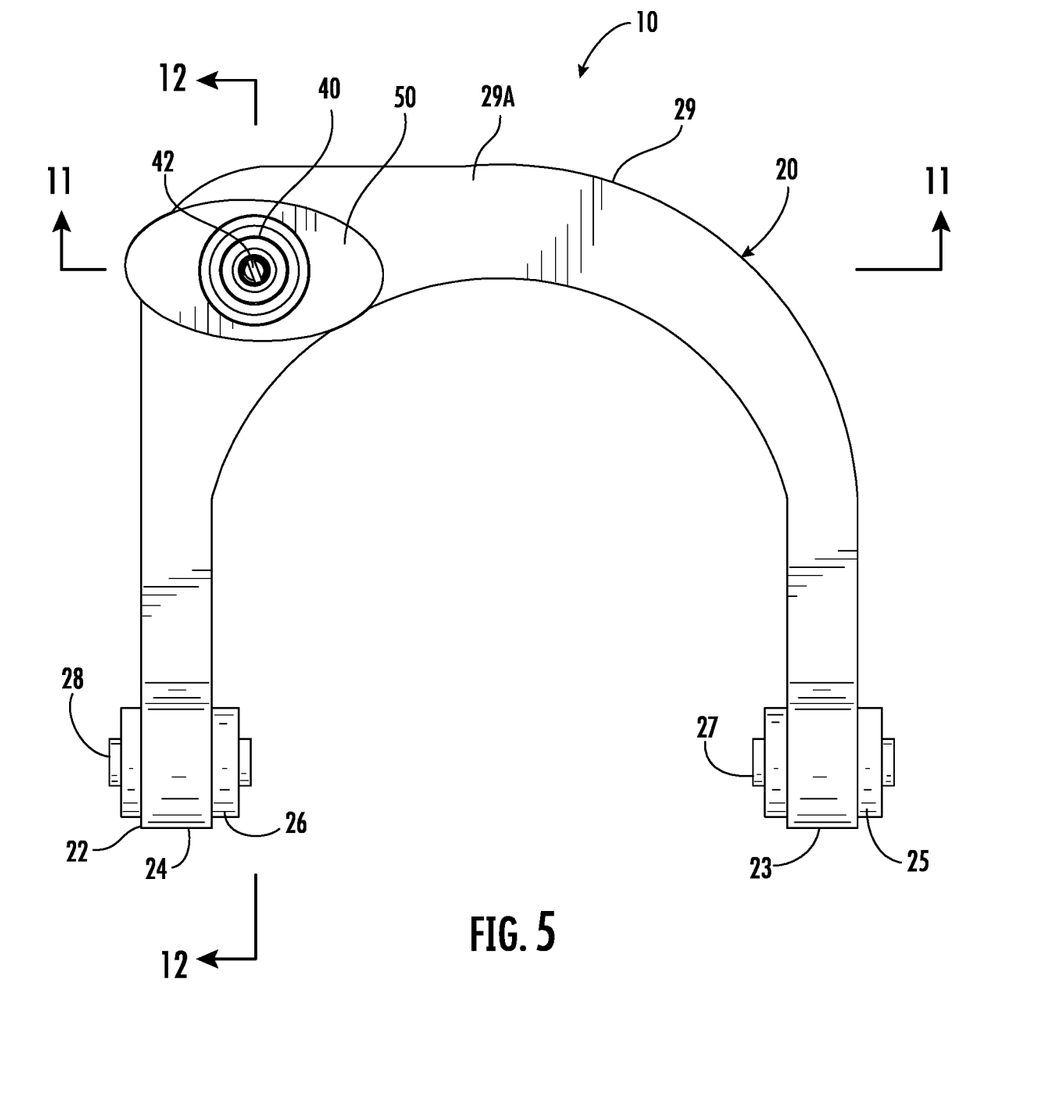
FIG. 5 is a top plan view of the control arm assembly shown in FIG. 1.
Figure 6:
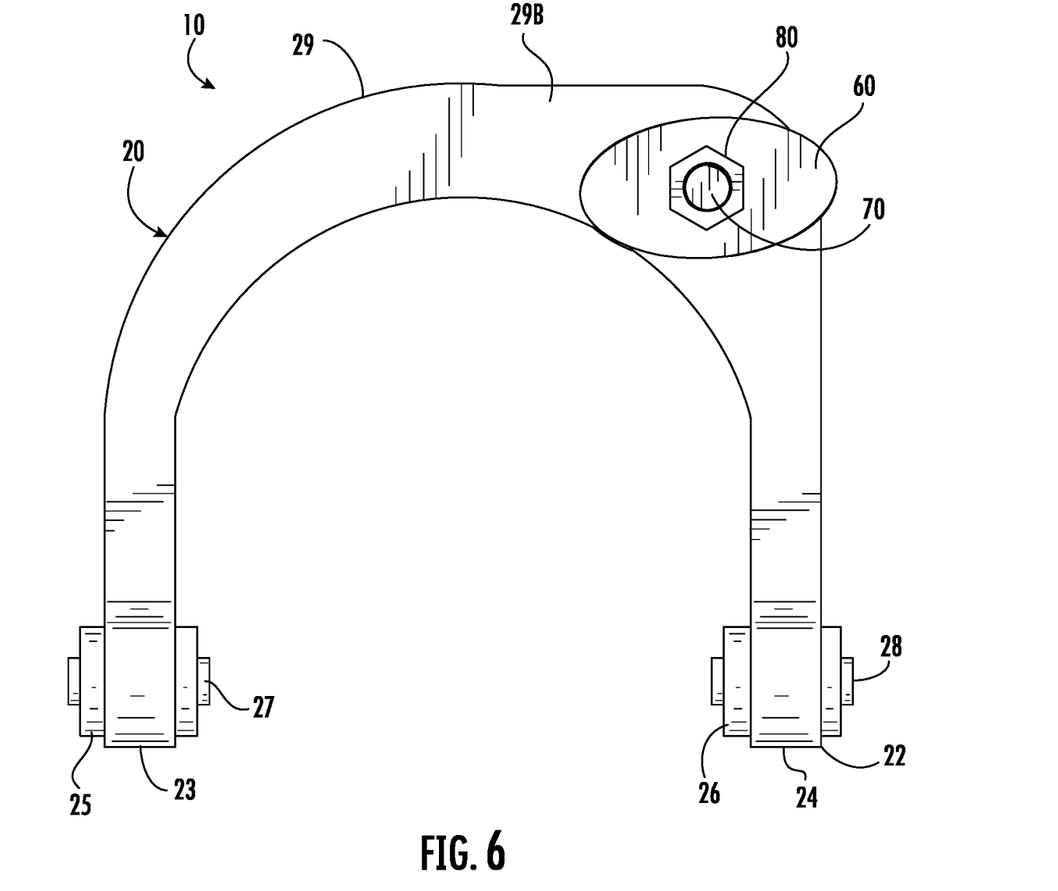
FIG. 6 is a bottom plan view of the control arm assembly shown in FIG. 1.
Figure 7:
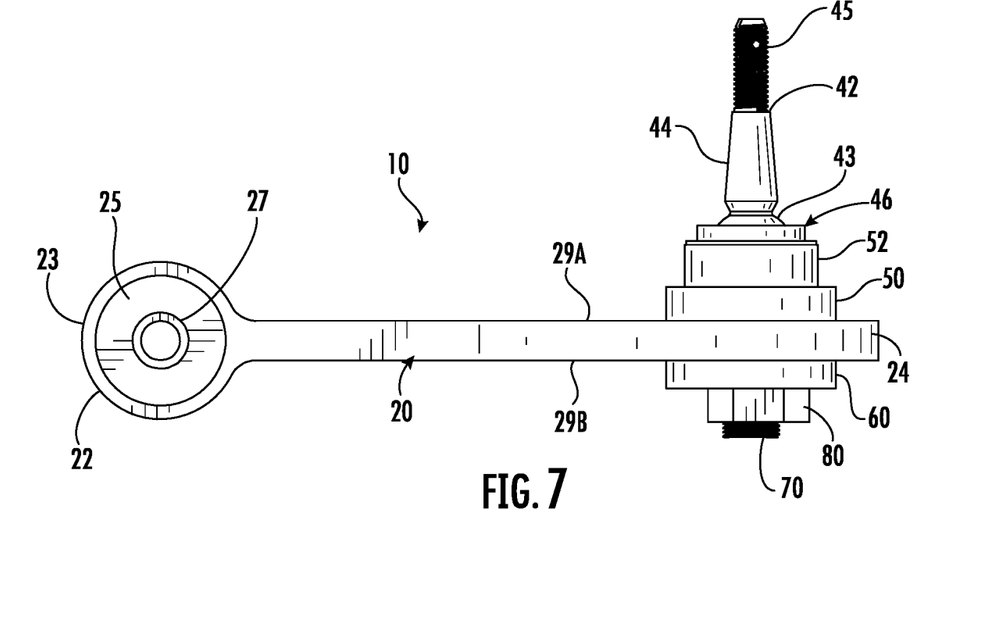
FIG. 7 is a front elevational view of the control arm assembly shown in FIG. 1.
Figure 8:
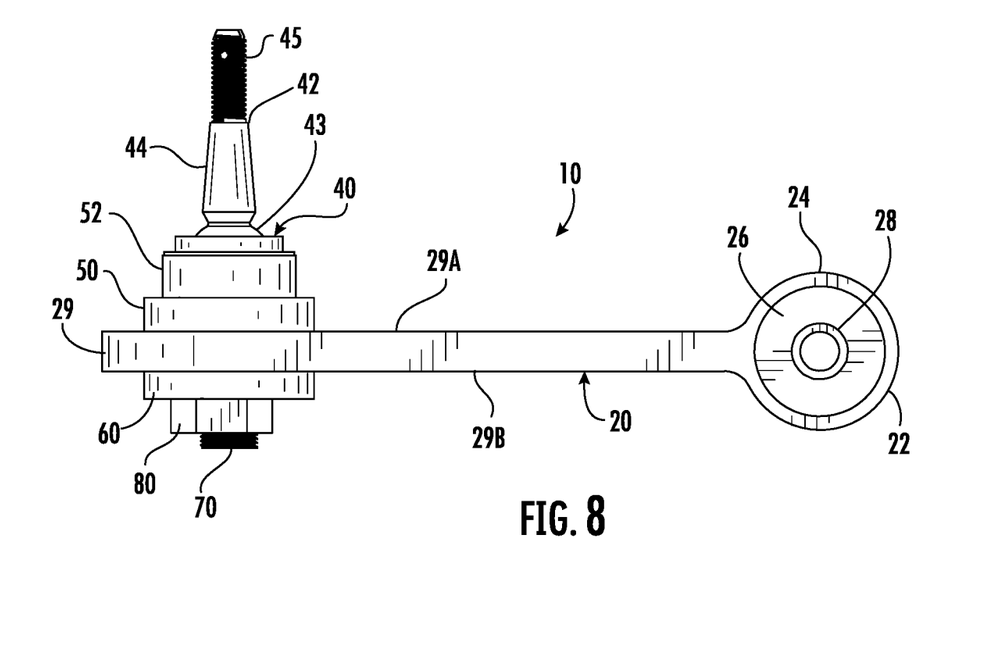
FIG. 8 is a rear elevational view of the control arm assembly as shown in FIG. 1.
Figure 9:
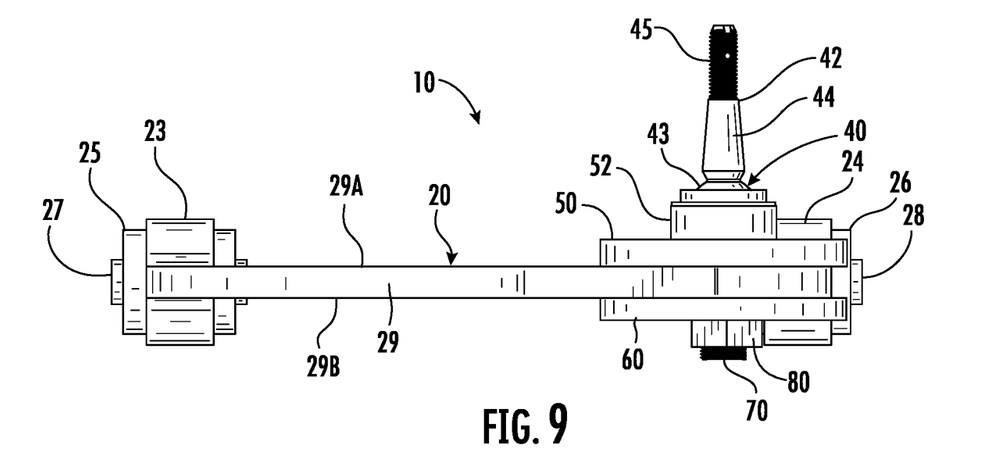
FIG. 9 is a left side elevational view of the control arm assembly shown in FIG. 1.
Figure 10:
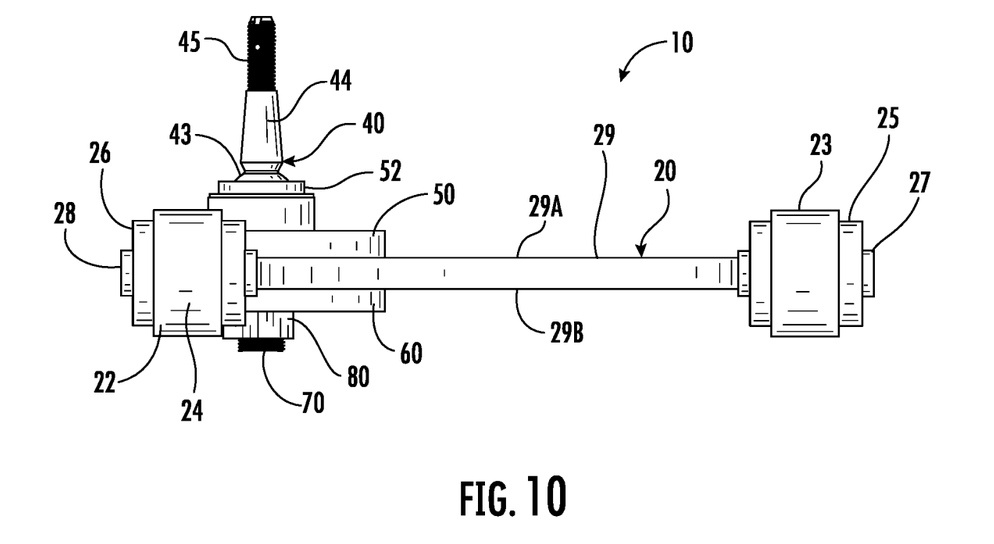
FIG. 10 is a right-side elevational view of the control arm assembly shown in FIG. 1.

In order to provide a more secure connection, as shown in detail in FIGS. 3 and 4, at least one of the top plate 50 or the bottom plate 60, and as illustrated both the top plate 50 and the bottom plate 60, may include serrations 56, 66 respectively, on a side 50A, 60A, thereof that contacts the arm body 20. This provides for secure positioning of the ball joint assembly 40 relative to the arm body 20 once the fastener or threaded element 70 along with the nut 80, if present, are torqued to the desired amount so that the serrations 56, 66 can engage with higher contact pressure into the surface(s) of the arm body 20 to prevent slipping of the top and/or bottom plates 50, 60 along with the ball joint assembly 40 relative to the arm body 20.

As shown throughout the drawings, both the top plate 50 and the bottom plate 60 are larger than the through aperture 30 in both directions. However, it is possible to provide one or both of the top plate 50 or the bottom plate 60 being larger than the through aperture 30 in only one direction. In the illustrated embodiment, the top and bottom mounting plates 50, 60 are shown as oval having a larger dimension along a first axis and a second axis relative to the through aperture 30. However, the specific configuration of the top and/or bottom plates 50, 60 can be varied depending upon the particular application and the available space for the adjustable control arm 10, and the shape can be adapted for the specific application.

While the through aperture 30 is illustrated as generally circular, those skilled in the art will understand that the specific shape of the through aperture 30 could be varied, depending upon the particular application.

Those skilled in the art will also recognize that the specific construction of the ball joint assembly 40 can also be varied within the scope of the present invention.

What is claimed is:

1. A vehicle suspension control arm comprising:
   an arm body having a first portion configured for mounting to a vehicle and a second portion that includes an aperture;
   a ball joint assembly that includes a ball joint stud pivotally connected to a top plate located on a first side of the second portion;
   a bottom plate located on a second side of the second portion, opposite the first side;
   a threaded element that extends through the aperture and is connected to the top plate and the bottom plate and is configured to clamp the top plate and the bottom plate against the second portion; and
   the aperture is larger than a largest cross-sectional dimension of the threaded element whereby a position of the ball joint assembly relative to the body is adjustable by movably positioning the ball joint assembly at a desired location that is limited by a locus of contact points between the threaded element and an inner surface of the aperture.

2. The vehicle control arm of claim 1, wherein the top plate includes a ball mount in which a ball of the ball joint stud is retained.

3. The vehicle control arm of claim 2, wherein the threaded element includes a first end that is threadedly engaged in a complementarily threaded aperture in the top plate.

4. The vehicle control arm of claim 3, wherein the first end has a diameter that is larger than a diameter of the ball, and the ball is insertable into the ball mount through the aperture in the top plate.

5. The vehicle control arm of claim 3, wherein the threaded element includes a second end that extends through a mounting aperture in the bottom plate.

6. The vehicle control arm of claim 5, further comprising a nut that threadedly engages the second end of the threaded element.

7. The vehicle control arm of claim 6, wherein the first end of the threaded element has a diameter that is larger than a diameter of the second end.

8. The vehicle control arm of claim 1, wherein at least one of the top plate or the bottom plate include serrations on a side thereof contacting the body.

9. The vehicle control arm of claim 1, wherein the top plate and the bottom plate are larger than the aperture.

10. An adjustable control arm comprising:
an arm body with a first portion, designated for mounting to a vehicle, and a second portion that includes a through aperture for passage of a fastener;
a ball joint assembly connected to the arm body, the ball joint assembly including a top plate that is positioned on a first side of the arm at the second portion and is configured to receive the fastener which extends through the through aperture;
the through aperture is larger than a largest cross-sectional dimension of the fastener that is located in the through aperture whereby the ball joint assembly is secured to the arm body in a desired location by the fastener; and
wherein the top plate includes serrations on a side thereof contacting the arm body.

11. The adjustable control arm of claim 10, wherein the top plate includes a ball mount in which a ball of a ball joint stud of the ball joint assembly is retained.

12. The adjustable control arm of claim 11, wherein the fastener includes a first fastener end that is threadedly engaged in a complementarily threaded aperture in the top plate.

13. The adjustable control arm of claim 12, wherein the first fastener end has a diameter that is larger than a diameter of the ball, and the ball is insertable into the ball mount through the aperture in the top plate.

14. The adjustable control arm of claim 12, further comprising a bottom plate located on a second side of the second portion, opposite the first side, and the fastener includes a second fastener end that extends through a mounting aperture in the bottom plate.

15. The adjustable control arm of claim 14, further comprising a nut that threadedly engages the second fastener end of the fastener.

16. The adjustable control arm of claim 15, wherein the first fastener end has a diameter that is larger than a diameter of the second fastener end.

17. The vehicle control arm of claim 10, wherein the top plate is larger than the aperture.

18. A kit for assembling an adjustable control arm, the kit comprising:
a fastener;
an arm body with a first portion, designated for mounting to a vehicle, and a second portion that includes a through aperture for passage of the fastener; and
a ball joint assembly including a top plate;
wherein the through aperture is larger than a largest cross-sectional dimension of the fastener, the ball joint is positionable on a top surface of the arm body over the through aperture, and the fastener is insertable from beneath the arm body, through the through aperture and into engagement with the ball joint assembly to secure ball joint assembly to the arm body in a desired location.

19. The kit of claim 18, wherein the top plate includes a ball mount and a threaded aperture, and the ball joint assembly includes a ball joint stud that is insertable through the threaded aperture into the ball mount such that a ball of the ball joint stud is retained in the ball mount.

20. The kit of claim 19, wherein the fastener includes a first end that is threadedly engaged in the threaded aperture in the top plate.

21. The kit of claim 20, further comprising a bottom plate, and wherein the fastener includes a second end that is adapted to extend through a mounting aperture in the bottom plate.

22. The kit of claim 21, further comprising a nut that threadedly engageable on the second end of the threaded element.

23. The kit of claim 22, wherein the first end of the fastener has a diameter that is larger than a diameter of the second end.

24. The kit of claim 18, wherein at least one of the top plate or the bottom plate include serrations on a side thereof that is adapted to contact the arm body.

25. The kit of claim 18, wherein the top plate and the bottom plate are larger than the aperture.

\* \* \* \* \*